United States Patent
Yang et al.

(10) Patent No.: US 9,411,791 B2
(45) Date of Patent: Aug. 9, 2016

(54) DEVICE CONTROL METHOD AND SYSTEM USING XML DOCUMENT

(71) Applicant: Samsung Electronics Co., Ltd., Suwon-si, Gyeonggi-do (KR)

(72) Inventors: Woo-seong Yang, Suwon-si (KR); Chi-tack Chang, Seoul (KR); Tae-kyung Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/026,914

(22) Filed: Sep. 13, 2013

(65) Prior Publication Data

US 2014/0013208 A1 Jan. 9, 2014

Related U.S. Application Data

(62) Division of application No. 11/589,808, filed on Oct. 31, 2006, now Pat. No. 8,560,089.

(30) Foreign Application Priority Data

Oct. 31, 2005 (KR) .................. 10-2005-0103426

(51) Int. Cl.
*G06F 17/22* (2006.01)
*H04N 1/00* (2006.01)

(52) U.S. Cl.
CPC ........ *G06F 17/2247* (2013.01); *H04N 1/00204* (2013.01); *H04N 1/00973* (2013.01); *H04N 2201/0074* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,006,039 A | 12/1999 | Steinberg et al. | |
| 6,163,816 A | 12/2000 | Anderson et al. | |
| 6,498,611 B1 * | 12/2002 | Beard et al. | 715/752 |
| 2003/0018755 A1 | 1/2003 | Masterson et al. | |
| 2003/0028624 A1 | 2/2003 | Hasan et al. | |
| 2003/0236973 A1 | 12/2003 | Nelson et al. | |
| 2004/0093376 A1 | 5/2004 | De Boor et al. | |
| 2005/0108649 A1 * | 5/2005 | Ueda | 715/760 |
| 2006/0227032 A1 * | 10/2006 | Vidal | 341/176 |
| 2009/0076633 A1 | 3/2009 | Sullivan et al. | |

FOREIGN PATENT DOCUMENTS

| | | |
|---|---|---|
| CN | 1499368 A | 5/2004 |
| GB | 2423602 A | 8/2006 |

(Continued)

*Primary Examiner* — Sean Shechtman
*Assistant Examiner* — Steven Garland
(74) *Attorney, Agent, or Firm* — Jefferson IP Law, LLP

(57) ABSTRACT

A device control method and system that sets a control setting through a user interface generated by using an XML (eXtensible Markup Language) document is provided. Operation control of a device is set through a user interface that is generated using an XML (eXtensible Markup Language) document. A user interface is generated for control settings of a device based on received first information, second information corresponding to control setting values is input through the user interface, and the second information is transmitted to the device and corresponding control settings of the device are set. Accordingly, operation control of the device can be controlled through a user interface by using a single standardized document regardless of the type of device.

10 Claims, 12 Drawing Sheets

(56) References Cited

FOREIGN PATENT DOCUMENTS

| JP | 10-105501 | 4/1998 |
| JP | 2003-348289 | 12/2003 |
| JP | 2004-032086 | 1/2004 |
| JP | 2004-295325 | 10/2004 |
| KR | 10-2002-0000569 | 1/2002 |
| KR | 10-2004-0005247 A | 1/2004 |
| KR | 10-2005-0043262 A | 5/2005 |
| KR | 10-2005-0086185 A | 8/2005 |
| WO | WO 03/088031 A1 | 10/2003 |

* cited by examiner

| COMBOBOX | RADIOBUTTON | CHECKBOX | SPIN | SLIDER | EDITBOX |
|---|---|---|---|---|---|
| ▭▾ | ⊙ ○ | ☑ ☐ | ▭ ⇳ | ▭ | ▭ |
| STATICTEXT | BUTTON | IPADDRESS | POPUP | GROUP | |
| ▭ | ▨ | ☐.☐.☐.☐ | N/A | N/A | |

DEVICE CONTROL METHOD AND SYSTEM USING XML DOCUMENT

CROSS-REFERENCE TO RELATED PATENT APPLICATIONS

This is a division of U.S. patent application Ser. No. 11/589,808, filed Oct. 31, 2006, entitled "Device Control Method And System Using XML Document", now U.S. Pat. No. 8,560,089, issued Oct. 15, 2013, which claims the benefit under 35 U.S.C. §119(a) of Korean Patent Application No. 10-2005-0103426, filed on Oct. 31, 2005, in the Korean Intellectual Property Office, the entire contents of all of said prior applications being incorporated herein by reference.

BACKGROUND OF THE INVENTION

1. Field of the Invention

The present invention relates to a device control method and system thereof More particularly, the present invention relates to a device control method and system in which settings for operation control of a device through a user interface are generated using an XML (eXtensible Markup Language) document.

2. Description of the Related Art

Printers, copiers, or multifunctional devices generally provide a user interface for settings for operation control. A user interface which is provided by a device is in a text based menu type in which text based selection items displayed in a display window of a device are selected using an operation key. However, when the display window of the device is small or when multiple items must be set, the text based menu type user interface is inconvenient. Therefore, a method of connecting a host such as a computer to a device and for providing a user interface through a display window of the connected host has recently been used.

Setting items and possible setting states of a device, which will be set for operation control, are first ascertained to provide a user interface through a host. A program for generating the user interface then must be created to reflect these setting items and possible setting states. Control code values for device operation control are previously specified and must then be shared with a device development manager.

Each time a new device model is developed, changed setting items must be ascertained, and a previously created program must be modified or re-created to reflect these new or changed items. Also, programs related to a user interface have to be re-created for each platform according to the type of host. Thus, since different programs have to be created according to the combination of a device model and a platform, a lot of development time is required.

Since it is difficult to interpret data transmitted and received between a host and a device using a user interface, debugging is not easy. Also, since a standardized control type is not used in the user interface, a configuration of the user interface has many limitations, and is less extensible.

Accordingly, there is a need for an improved system and method for controlling a device through a user interface generated by using a single standardized control type.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a device control method in which settings required for device operation control through a user interface are generated using a single standardized control type regardless of the type of device or host, and a system thereof.

According to an aspect of an exemplary embodiment of the present invention, there a device control method is provided. A user interface for settings of a device is generated based on received first information. Second information corresponding to control setting values input through the user interface is generated and the second information is transmitted to the device and corresponding control settings of the device are executed.

The first or second information may be in an XML (eXtensible Markup Language) document format. The user interface may be a menu in a tree-like structure corresponding to a relationship between elements of an XML document. Elements of the XML document with predetermined attributes may become control menu items that can be input by a user. The first information may be received from the device.

According to another aspect of an exemplary embodiment of the present invention, a device control method is provided. Control settings of a device are set in a system in which a host and the device are connected to each other, The host receives initial information from the device, the host generates a user interface for control settings required for operation control of the device based on the first information and control settings are set for operation control of the device through the user interface.

According to another aspect of an exemplary embodiment of the present invention, a device control system is provided. The device control system comprises a device and a host which generates a user interface for settings to control the device based on received first information and transmits secondary information corresponding to control setting values input through the user interface to the device so that the device executes corresponding control settings based on the second information.

According to another aspect of an exemplary embodiment of the present invention, a computer readable recording medium having embodied thereon a computer program for executing the above device control method is provided.

Other objects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
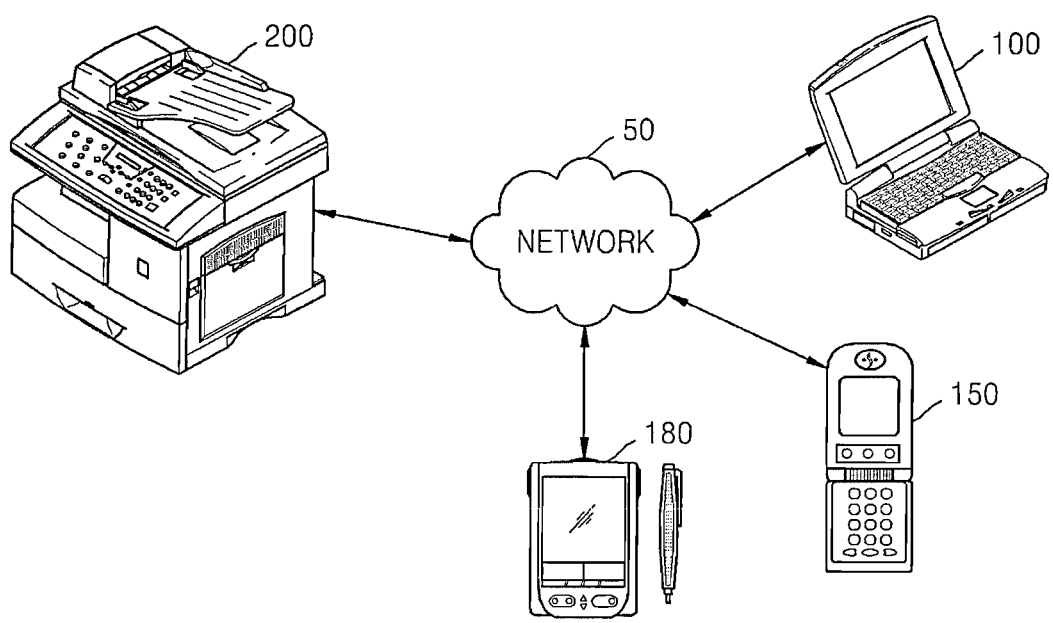
FIG. 1 is a view for explaining a device control method according to an exemplary embodiment of the present invention.

FIG. 1 is a view explaining a device control method according to an exemplary embodiment of the present invention. Referring to FIG. 1, hosts including a notebook computer 100, a mobile phone 150, a personal digital assistant (PDA) 180, and a device 200, such as a multifunctional device, are communicatively connected to each other through a wireless/wired network 50.

The hosts generate user interfaces for settings for operation control of the device 200 based on information. The information may be a document in an XML format received from the device 200 or another device.

A user sets settings for operation control of the device 200 through the user interfaces generated by the hosts, or changes previous settings. The set or changed settings are transmitted to the device 200, and corresponding settings of the device 200 are set.

Figure 2:
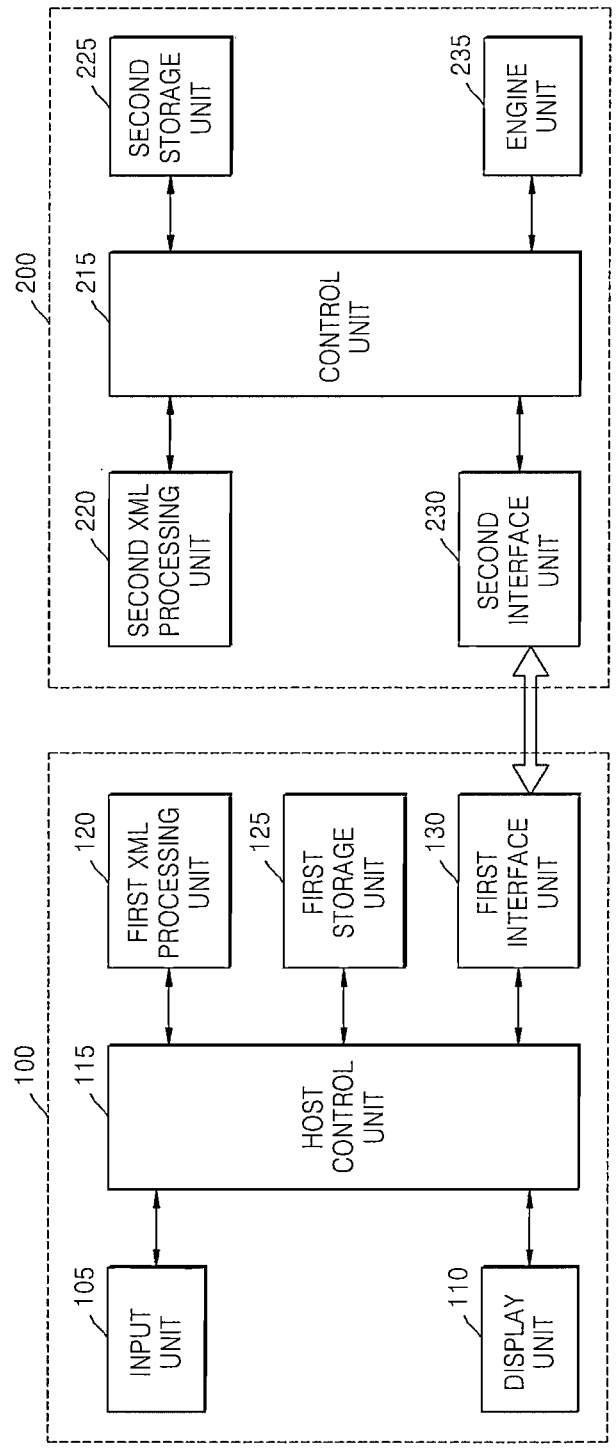
FIG. 2 is a block diagram of a device control system according to an exemplary embodiment of the present invention.

FIG. 2 is a block diagram of a device control system, which includes a computer as a host 100 and a printer as a device 200, according to an exemplary embodiment of the present invention. Referring to FIG. 2, the host 100 includes an input unit 105, a display unit 110, a host control unit 115, a first XML processing unit 120, a first storage unit 125, and a first interface unit 130. The device 200 includes a control unit 215, a second XML processing unit 220, a second storage unit 225, a second interface unit 230, and an engine unit 235. The host 100 and the device 200 are communicatively connected to each other via the first and second interface units 130 and 230.

The input unit 105 receives an operation command or setting values from a user, and transmits them to the host control unit 115. The display unit 110 displays a user interface view for settings required for the operation control of the device 200. The first XML processing unit 120 analyzes an XML document transmitted from the device 200, converts the XML document into a form that the host control unit 115 can use or creates an XML document which corresponds to received data. The first storage unit 125 stores a program or data necessary for operation of the host 100. The first interface unit 130 provides a communication interface to communicate with the device 200. The host control unit 115 controls operations of the above units and overall operations of the host 100.

The second XML processing unit 220 of the device 200 converts the transmitted and created XML document into a data form that the control unit 215 can use. The second storage unit 225 stores data or a program necessary for operation, and specifically, an XML document which is transmitted to the host 100 and used to create a user interface. The engine unit 235 provides a mechanism for printing transmitted print data onto a sheet of printing paper. The second interface unit 230 provides a communication interface to communicate with the host 100. The control unit 215 controls operations of the above units and overall operations of the device 200.

The first and second interface units 130 and 230 may use a variety of communication interface types such as a universal serial bus (USB) which is a plug and play interface between a computer and a peripheral device, Bluetooth, and a wireless LAN, which allows data transmission and reception.

Figure 3:
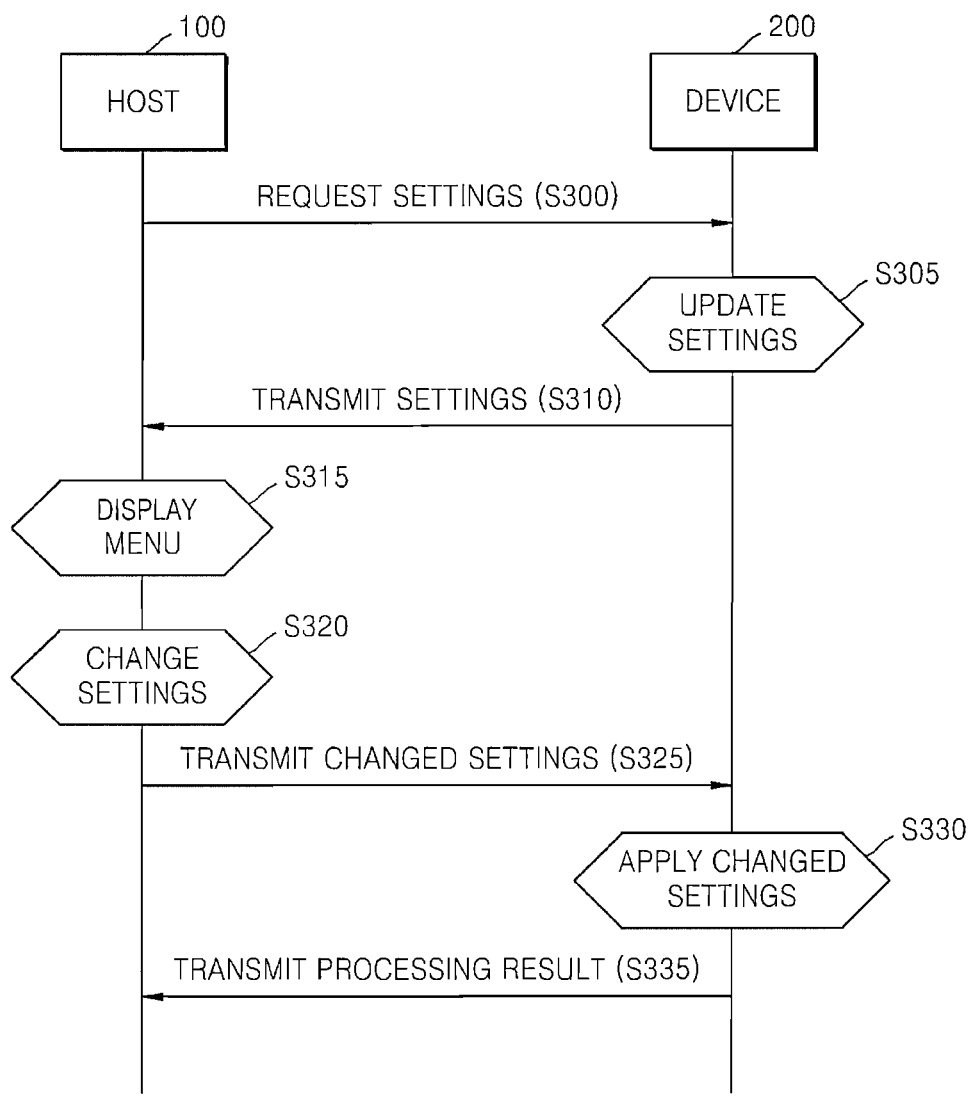
FIG. 3 is a flowchart for explaining operations of the device control system of FIG. 2 according to an exemplary embodiment of the present invention.

FIG. 3 is a flowchart illustrating operations of a device control system according to an exemplary embodiment of the present invention. The operation procedures of the device control system, according to the exemplary embodiment of the present invention, will be described below with reference to FIGS. 2 and 3. First, the host 100 requests settings of the device 200 (step S300). In response, the control unit 215 of the device 200 updates the settings of the device 200 (step S305) and transmits the settings (step S310). The second XML processing unit 220 creates an XML document which is related to the settings and which reflects the settings updated and transmitted by the control unit 215. The second XML processing unit 220 also stores the XML document in the second storage unit 225. The control unit 215 transmits the XML document stored in the second storage unit 225 to the host 100 via the second interface unit 230.

The first XML processing unit 120 of the host 100, which parses and creates XML documents, analyzes the XML document transmitted from the device 200, and converts the XML document into a data form suitable for the host control unit 115. That is, the first XML processing unit 120 properly reconstructs tags in the transmitted XML file and contents included in the tags. The host control unit 115 generates a user interface view using the reconstructed data and then displays the user interface view on the display unit 110 (step S315).

Figures 4, 5:
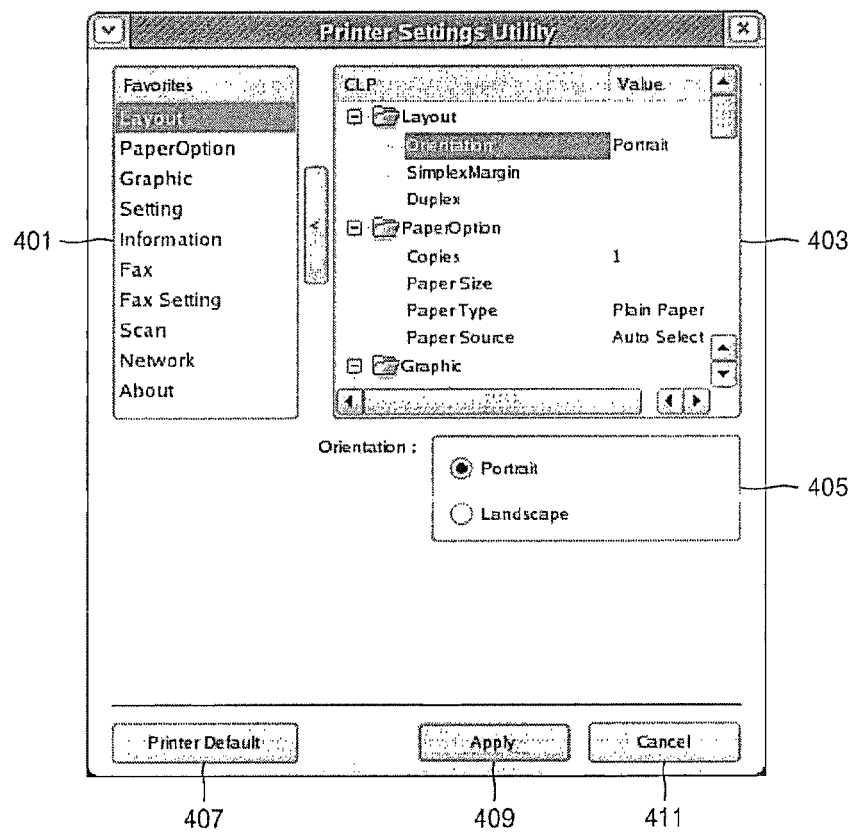
FIG. 4 illustrates an example of a user interface view generated in a device control system, according to an exemplary embodiment of the present invention.
FIG. 5 illustrates examples of control menu items of a user interface comprising a variety of "TYPE" attributes according to an exemplary embodiment of the present invention.

FIG. 4 is an example of the user interface view displayed on the display unit 110. In FIG. 4, a portion denoted by reference numeral 401 corresponds to upper menu items, and a portion denoted by reference numeral 403 corresponds to sub menu items. A portion denoted by reference numeral 405 corresponds to control menu items for user settings. The host 100 provides a basic structure of the user interface view. Menu items of the user interface view are set based on an XML document which is transmitted from the device 200. Strings which are displayed in the menu items in a tree-like structure of the user interface view may be the same as element names of the XML document. If elements have "STRING" attributes, a value in the attribute is used as the string of the user interface. A method of generating the user interface view will be described in detail later.

The user sets settings for operation control through the user interface view displayed in the display unit 110, or changes previous settings (step S320). More specifically, the user selects a desired menu item according to a tree-like structure of the user interface view. With respect to the selected menu item, control menu items which the user can input are displayed, and the user inputs a desired setting value or changes a previous setting value and finally clicks an apply button 409.

The host control unit 115 extracts the items set or changed by the user through the user interface view, and transmits the items to the first XML processing unit 120. The first XML processing unit 120 creates an XML document corresponding to the items. The host control unit 115 transmits the XML document to the device 200 via the first interface unit 130 (step S325).

The device 200 receives the XML document corresponding to the set or changed items from the host 100 via the second interface unit 230. The second XML processing unit 220 analyzes contents of the XML document and transmits the contents to the control unit 215. In response, the control unit 215 sets corresponding settings or changes the previous settings (step S330). If it is not possible to set corresponding settings or change the previous settings, the control unit 215 disregards the contents. The control unit 215 of the device 200 transmits the setting result to the host 100 (step S335).

The user interface for settings required for the operation control of the device 200 can be created using the XML document transmitted from the device 200. The user can also easily set or change settings of the device 200 through the created user interface view. According to the exemplary embodiment of the present invention, the XML document used for creating the user interface is received from the device 200. However, the XML document may be received from another server or device.

The procedures of creating the user interface view of the host 100 using the XML document transmitted from the device 200 will be described in detail below. The basic structure of the XML document transmitted from the device 200 to the host 100 is as follows.

TABLE 1

```
<?xml version="1.0" encoding="UTF-8"?>
<PrinterSettingInfo>
    <Menu-Level>
        <Menu-Level2>
            ...
                <Menu_LastLevel Attribute="XXX">
                    <value-Node/>
                    ...
        </Menu-Level2>
    </Menu-Level>
    ...
</PrinterSettingInfo>
```

XML, which is a markup language proposed by the World Wide Web Consortium, was created to overcome limitations of hypertext markup language (HTML). In XML, user tags can be created unlike HTML. According to properties of XML, relationships between elements can be represented as a tree-like structure of elements. This tree-like structure of the elements can be displayed as a tree based menu in the user interface view.

The first menu item of the user interface view corresponds to <Menu-Level> in Table 1. With reference to FIG. 4, "Layout", "PaperOption", "Graphic", "Setting", "Information", "Fax", "Fax Setting", "Scan" "Network", and "About" represented by reference numeral 401 are the first menu items.

Therefore, the string in the tree menu items of the user interface is the same as an element name of an XML program. Alternatively, elements that have individual "STRING" attributes use a value written in the attribute as the string of the user interface. For example, in the case of <Layout STRINGS="Layout">, Layout becomes a menu item. An XML document corresponding to FIG. 4 is illustrated below in Table 2.

TABLE 2

```
<?xml version="1.0" encoding="UTF-8">
<PrinterSettingInfo>
<Layout STRINGS="Layout">
    <Menu-Level2>
    ...
    </Menu-Level2>
</Layout>
<PaperOption STRINGS="PaperOption">
    <Menu-Level2>
    ...
    </Menu-Level2>
</PaperOption>
<Grphic STRINGS="Grpahic">
    <Menu-Level2>
    ...
    </Menu-Level2>
</Graphic>
<Setting STRINGS="Setting">
    <Menu-Level2>
    ...
    </Menu-Level2>
</Setting>
...
<Network STRINGS="Network">
    <Menu-Level2>
    ...
    </Menu-Level2>
</Network>
<About STRING="About">
    <Menu-Level2>
    ...
    </Menu-Level2>
</About>
</PrinterSettingInfo>
```

A sub menu item of the first menu item corresponds to <Menu-Level 2>. In FIG. 4, a portion represented by reference numeral 403 includes menu items, such as "Orientation", "SimplexMargin", and "Duplex". These menu items are displayed when "Layout" is selected and are the sub menu items. In this manner, a menu in a tree-like structure can be created.

Some items of the menu items of the tree-like structure in the user interface view may correspond to branch nodes, and other items may correspond to leaf nodes. When the user selects the leaf nodes, a control menu item such as a ComboBox or a radio button through which setting data can be input is displayed. According to an exemplary implementation, a determination is made as to whether an item is a branch node or a leaf node. This determination is made according to whether an XML element corresponding to the item has a "TYPE" attribute. The element with the "TYPE" attribute becomes the leaf node, and the control menu item, which should be displayed when the user selects the leaf node, is determined according to a predetermined value such as TYPE="COMBOBOX".

Table 3 is an example of an XML document corresponding to a "Graphic" item in the user interface view. "FACTORY" is a setting value set when a device was shipped, "CURRENT" is a current setting value, "MIN" and "MAX" are the minimum value and the maximum value, respectively, and "STEP" is an increase or decrease unit of a setting value.

TABLE 3

```
...
<Graphic STRING="Graphic">
    <Color TYPE="GROUP" STRING="Color">
    <AutoColorCalibration TYPE="CHECKBOX" STRING="Auto Color
Calibration" FACTORY="OFF" CURRENT="LOW">
        <Auto STRING="Auto"/>
        <Off STRING="Off"/>
    </AutoColorCalibration>
    <ManualColorAdjustment TYPE="POPUP" STRING="Manual
    Color Adjustment"
BUTTONLABEL="Color Adjustment">
<Cyan TYPE="SLIDER" STRING="Cyan" FACTORY="0"
CURRENT="0" MIN="-5" MAX="5" STPE ="1">
<Magenta TYPE="SLIDER" STRING="Magenta" FACTORY="0"
CURRENT="0" MIN="-5" MAX="5" STPE ="1" >
<Yellow TYPE="SLIDER" STRING="Yellow" FACTORY="0"
CURRENT="0" MIN="-5" MAX="5" STPE ="1">
<Black TYPE="SLIDER" STRING="Black" FACTORY="0"
CURRENT="0" MIN="-5" MAX="5"STPE ="1" >
</MauanlColorAdjustment>
```

FIG. 5 illustrates examples of control menu items of the user interface with "TYPE" attributes. Graphics corresponding to the control menu items with attributes such as "COMBOBOX", "RADIOBUTTON", "CHECKBOX", "SPIN", "SLIDER", "EDITBOX", "STATICTEXT", "BUTTON", and "IPADDRESS" are illustrated in FIG. 5. As illustrated in FIG. 5, most of the general control menu items provided by the user interface can be implemented as graphics, and may be implemented as an additional predetermined type.

Figure 6:
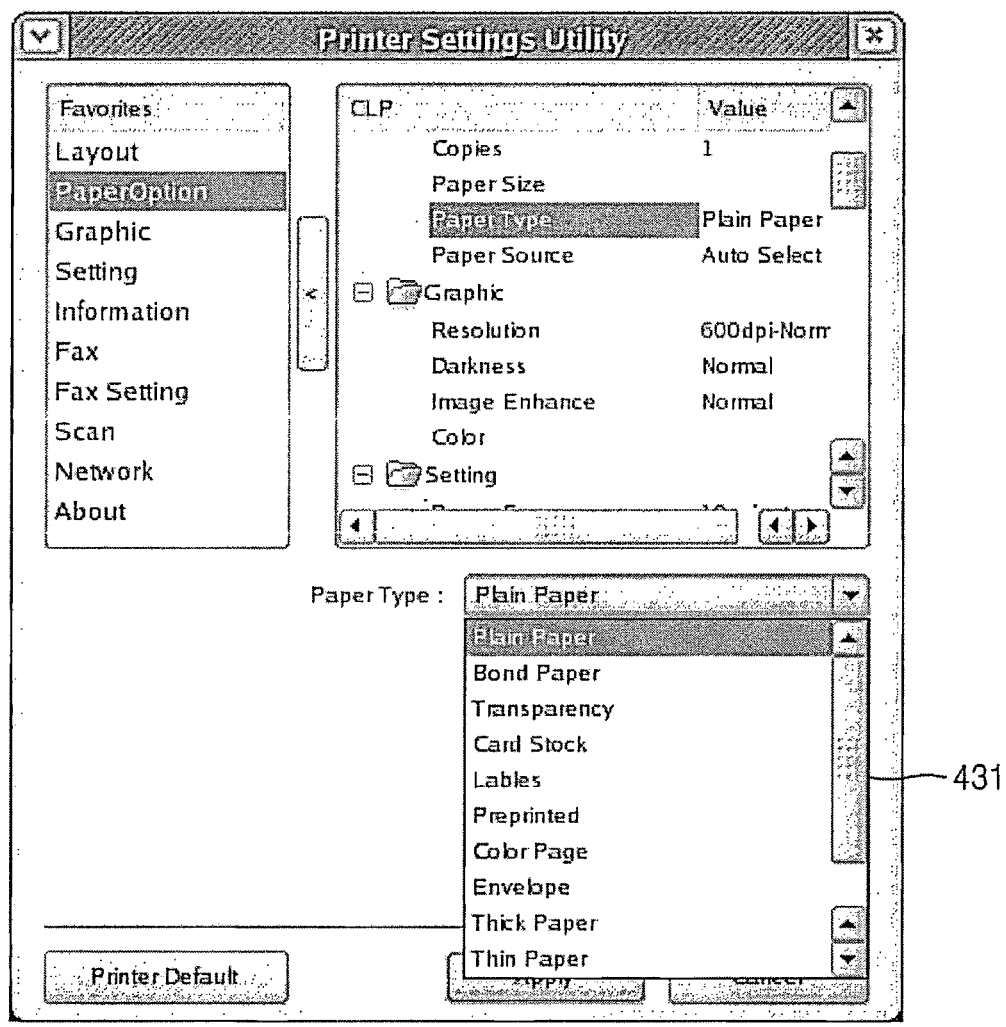
FIG. 6 illustrates an example of a user interface view in which a "COMBOBOX" attribute is rendered according to an exemplary embodiment of the present invention.

FIGS. 6 through 14 illustrate various examples of menu items which are displayed in the user interface view when "Paper Option" is selected. In FIG. 6, a "COMBOBOX" attribute is rendered in the user interface view. In FIG. 6, a portion denoted by reference numeral 431 corresponds to TYPE="COMBOBOX" of an XML document.

Figure 7:
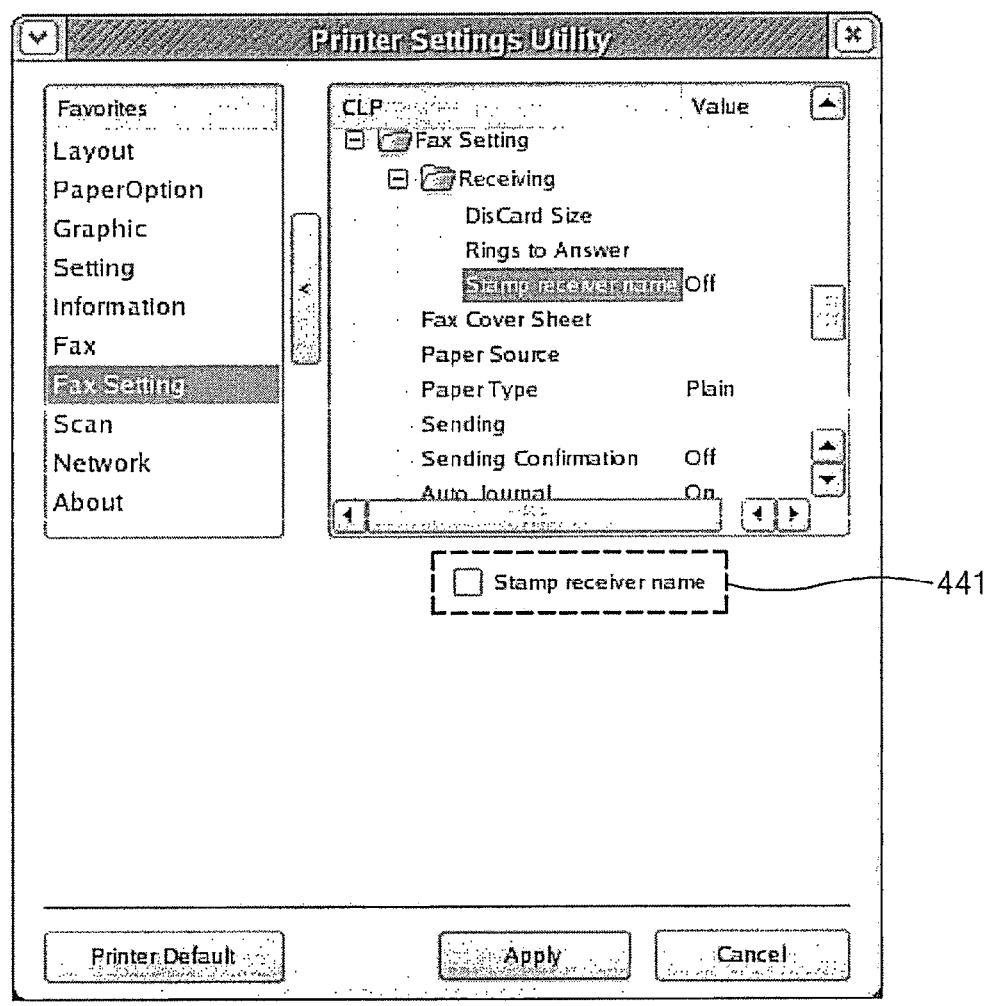
FIG. 7 illustrates an example of a user interface view in which a "CHECKBOX" attribute is rendered according to an exemplary embodiment of the present invention.

FIG. 7 illustrates a user interface view in which a "CHECKBOX" attribute is rendered. In FIG. 7, a portion denoted by reference numeral 441 corresponds to TYPE="CHECKBOX" of an XML document.

Figure 8:
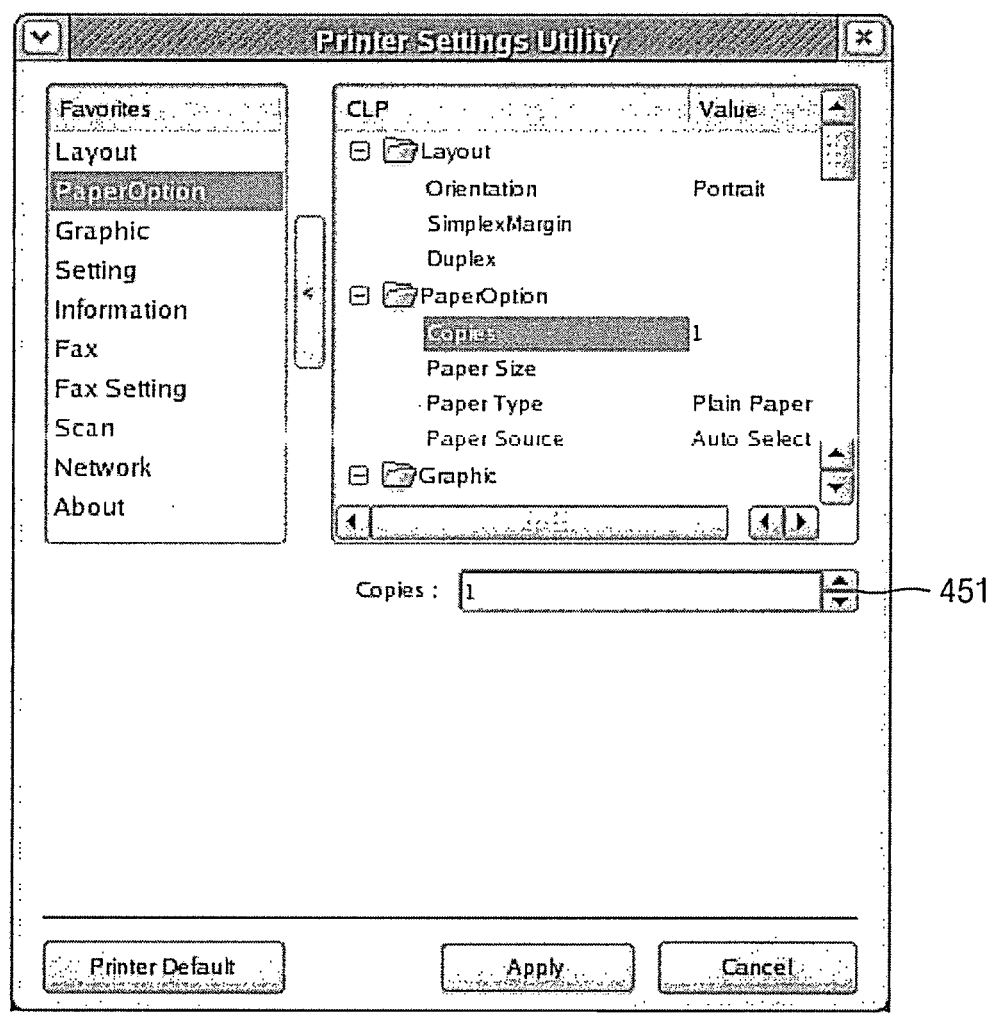
FIG. 8 illustrates an example of a user interface view in which a "SPIN" attribute is rendered according to an exemplary embodiment of the present invention.

FIG. 8 illustrates a user interface view in which a "SPIN" attribute is rendered. In FIG. 8, a portion denoted by reference numeral 451 corresponds to TYPE="SPIN" of an XML document.

Figure 9:
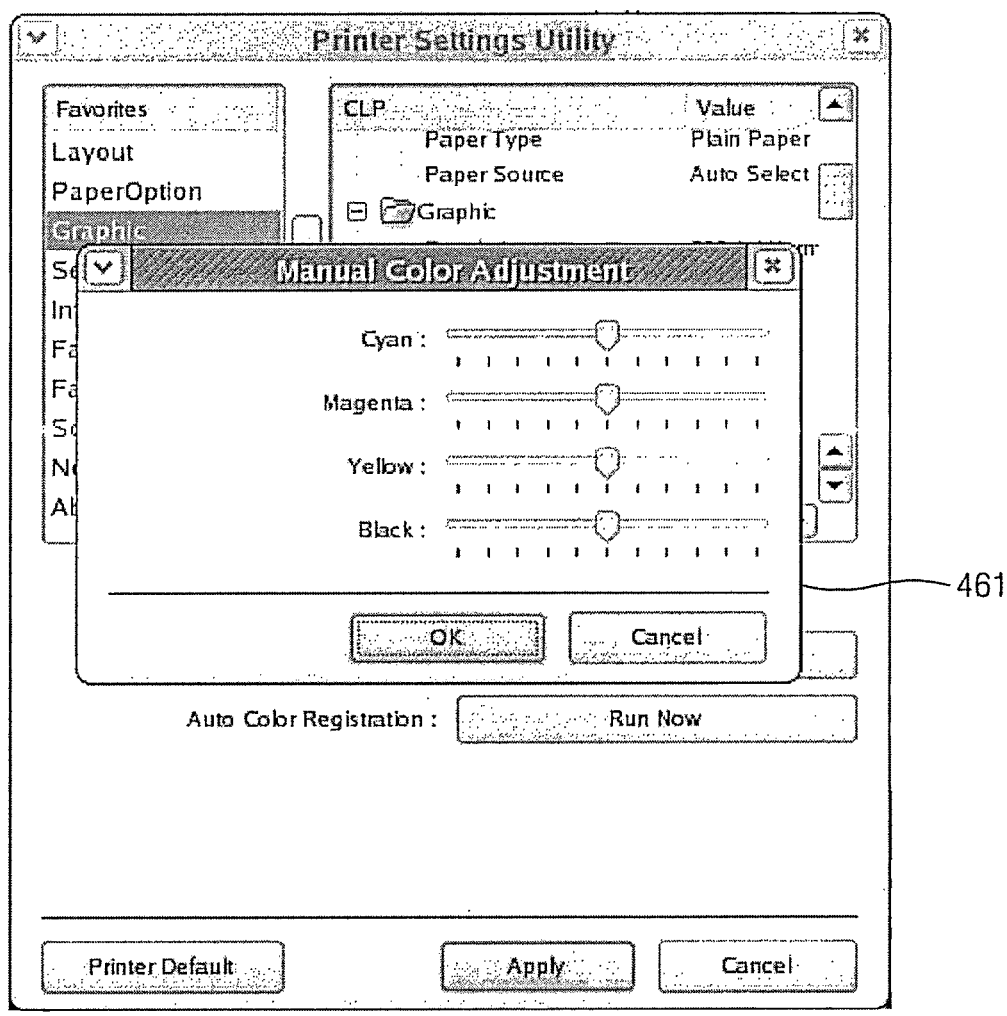
FIG. 9 illustrates an example of a user interface view in which a "SLIDER" attribute is rendered according to an exemplary embodiment of the present invention.

FIG. 9 illustrates a user interface view in which "SLIDER" and "POPUP" attributes are rendered. In FIG. 9, "Manual Color Adjustment" in a portion denoted by reference numeral 461 corresponds to the "POPUP" attribute for displaying Cyan, Magenta, Yellow, and Black menu items, and each of Cyan, Magenta, Yellow, and Black menu items corresponds to TYPE="SLIDER" of an XML document.

Figure 10:
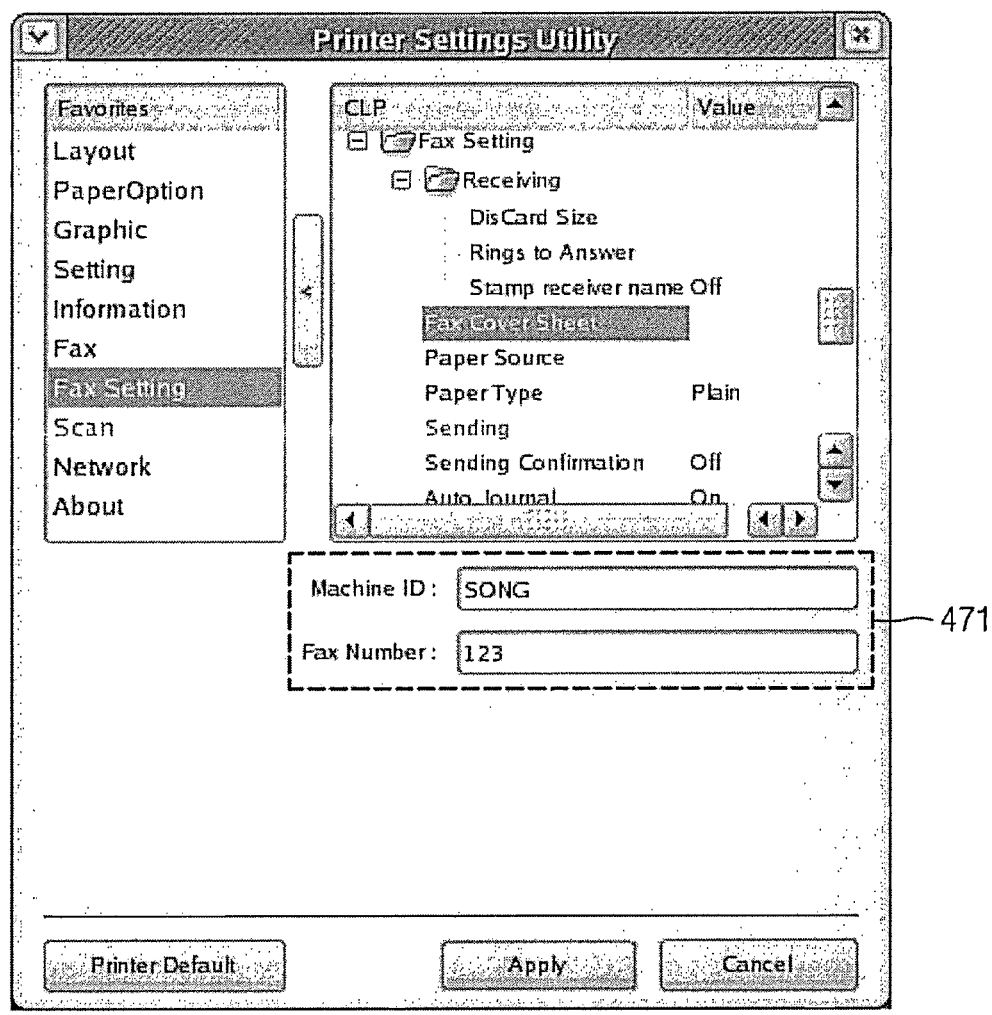
FIG. 10 illustrates an example of a user interface view in which an "EDITBOX" attribute is rendered according to an exemplary embodiment of the present invention.

FIG. 10 illustrates a user interface view in which an "EDITBOX" attribute is rendered. In FIG. 10, a portion represented by reference numeral 471 corresponds to TYPE="EDITBOX" of an XML document.

Figure 11:
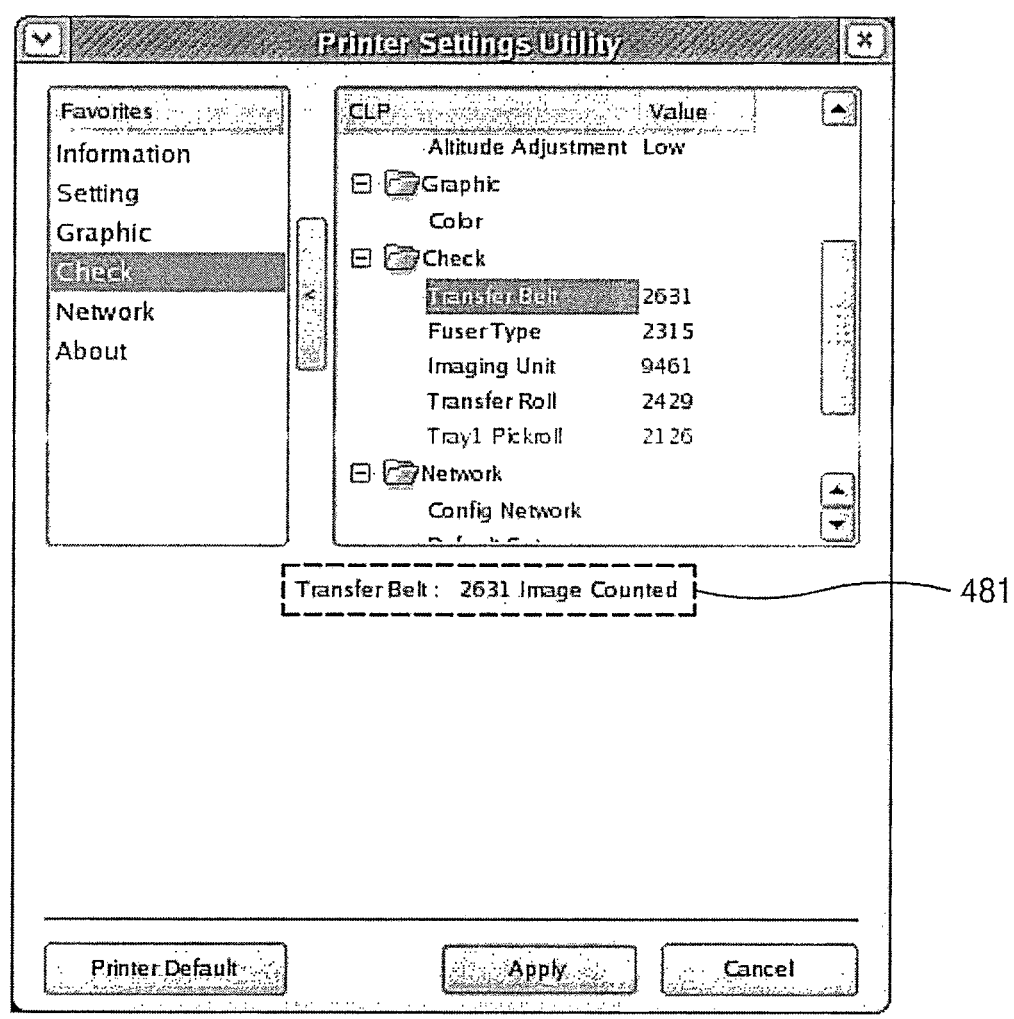
FIG. 11 illustrates an example of a user interface view in which a "STATICTEXT" attribute is rendered according to an exemplary embodiment of the present invention.

FIG. 11 illustrates a user interface view in which a "STATICTEXT" attribute is rendered. In FIG. 11, a portion denoted by reference numeral 481 corresponds to TYPE="STATICTEXT" of an XML document, and in this portion, a statically processed result of a selected item is displayed.

Figure 12:
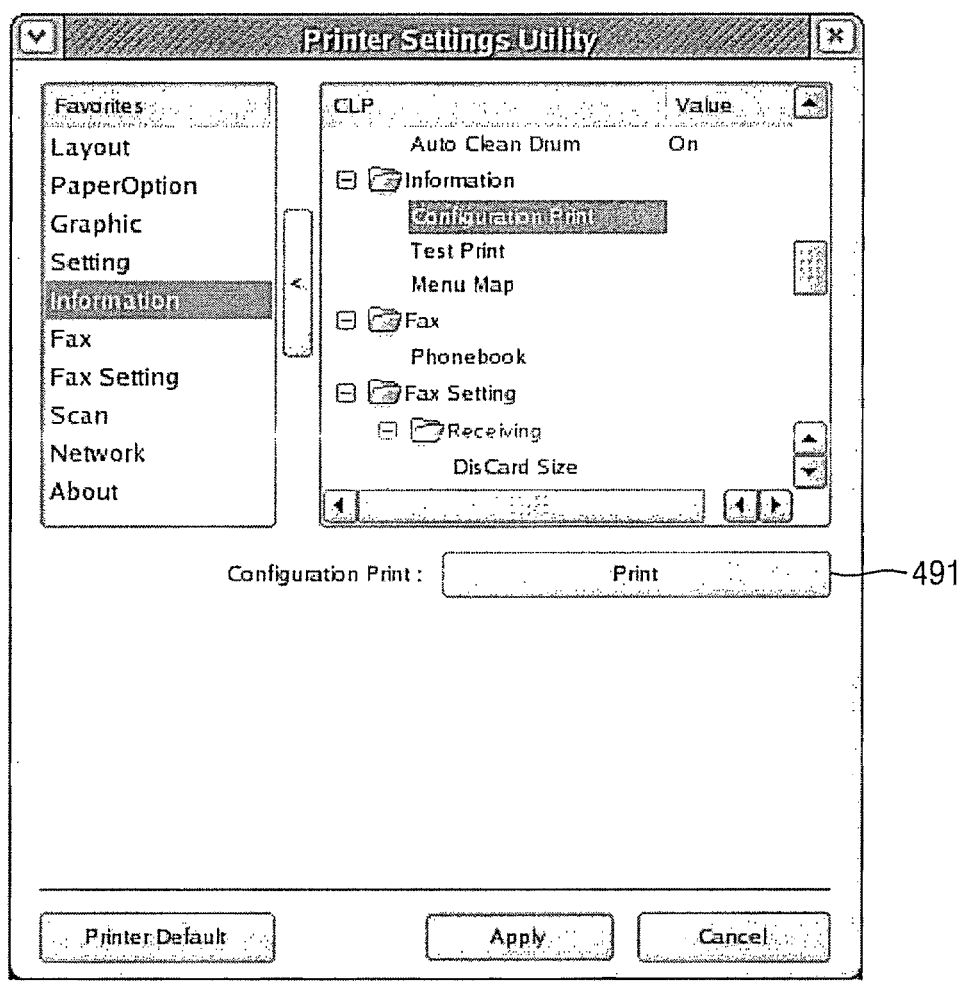
FIG. 12 illustrates an example of a user interface view in which a "BUTTON" attribute is rendered according to an exemplary embodiment of the present invention.

FIG. 12 illustrates a user interface view in which a "BUTTON" attribute is rendered. In FIG. 12, a portion denoted by reference numeral 491 corresponds to TYPE="BUTTON" of an XML document.

Figure 13:
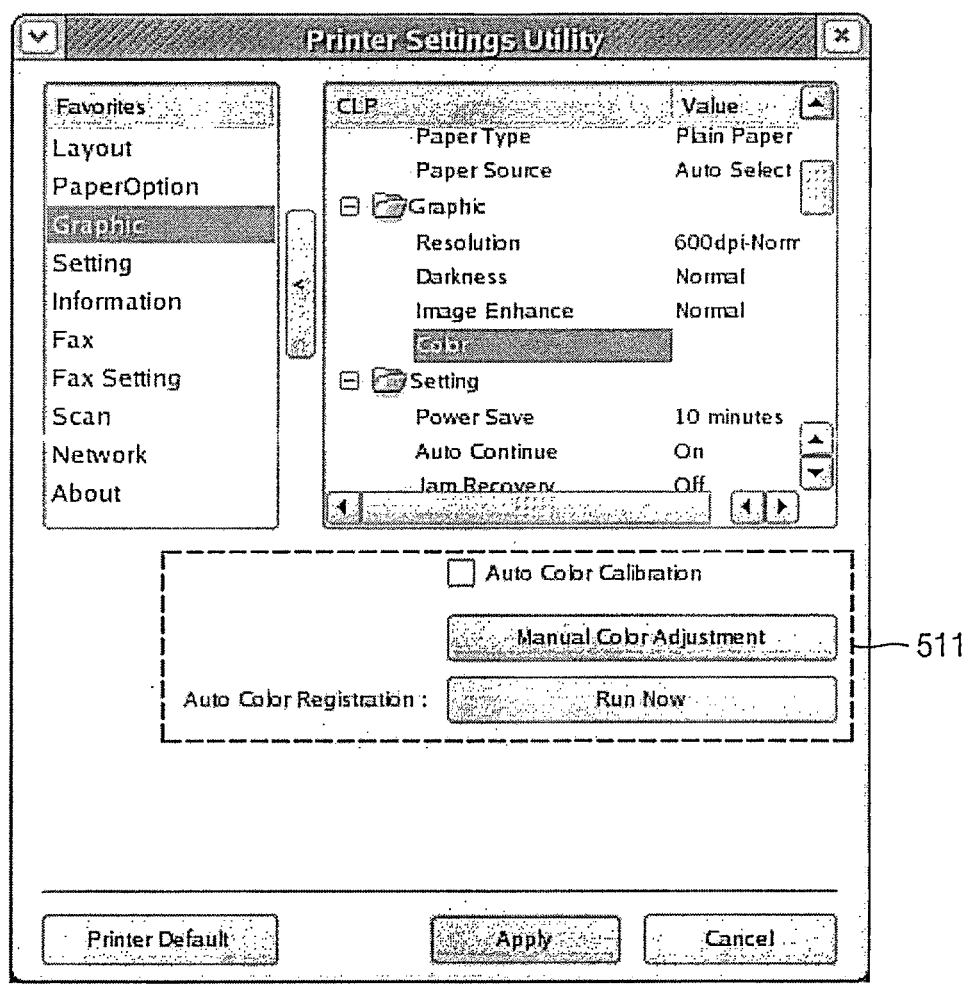
FIG. 13 illustrates an example of a user interface view in which a "GROUP" attribute is rendered according to an exemplary embodiment of the present invention.

FIG. 13 illustrates a user interface view in which a "GROUP" attribute is rendered. In FIG. 13, a portion denoted by reference numeral 511 corresponds to TYPE="GROUP" of an XML document. TYPE="POPUP" and TYPE="GROUP" are similar because they both gather sub leaf nodes and simultaneously display the leaf nodes. In the case of "POPUP" attribute, new windows pop up to display the leaf nodes.

According to an exemplary embodiment of the present invention, a user interface view may be configured, various setting items may be input, and determined settings may be changed by using "TYPE" attributes.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. It is also envisioned that carrier waves (such as data transmission through the Internet) can be utilized as an equivalent to a computer-readable medium. The computer readable recording medium can also be distributed over network coupled computer systems so that the computer readable code is stored and executed in a distributed fashion.

According to an exemplary embodiment of the present invention, information about settings or possible setting states of a device does not need to be previously ascertained since a user interface view can be configured using a received XML document. Thus, a user interface can be provided regardless of the type of host or device, and various platforms can be applied and used using a single standardized XML document.

According to an exemplary embodiment of the present invention, since data transmitted and received between a host and a device is of a text form of an XML document, debugging is easy.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A host which controls an image forming apparatus, the host comprising:
    an interface unit for providing a communication interface to communicate with the image forming apparatus, for requesting first information which is needed to make a user interface for setting control operation of the image forming apparatus to the image forming apparatus, and for receiving the first information from the image forming apparatus according to the request;
    an eXtensible Markup Language (XML) processing unit for analyzing the received first information and for generating the user interface by setting menu items of the user interface based on an analyzed result;
    a display unit for displaying the generated user interface;
    an input unit for receiving an operation command or setting values from a user; and a host controller for generating second information corresponding to the received operation command or setting values, wherein the interface unit transmits the generated second information to the image forming apparatus.

2. The host of claim 1, wherein the interface unit receives an executing result of the control setting from the image forming apparatus.

3. The host of claim 1, wherein at least one of the first and second information is in an XML document format.

4. The host of claim 3, wherein the user interface comprises a menu in a tree-like structure corresponding to a relationship between elements of an XML document.

5. The host of claim 4, wherein elements of the XML document comprising reference attributes become control menu items that can be input by a user.

6. The host of claim 5, wherein the reference attributes comprise at least one type of combo box, radio button, check box, spin, slider, edit box, static text, button and IP address.

7. An image forming apparatus controlled by a host, the image forming apparatus comprising:

an interface unit for providing a communication interface to communicate with the host, for transmitting first information which is needed to make a user interface for setting control operation of the image forming apparatus to the host responding to a request of the host, and for receiving second information corresponding to a setting or changed items from the host; and an eXtensible Markup Language (XML) processing unit for analyzing the received second information and for executing the setting or changing previous settings corresponding to the analyzed result, wherein at least one of the first and second information is in an XML document format, and wherein the user interface comprises a menu in a tree-like structure corresponding to a relationship between elements of an XML document.

8. The image forming apparatus of claim 7, wherein elements of the XML document comprising reference attributes become control menu items that can be input by a user.

9. The image forming apparatus of claim 8, wherein the reference attributes comprise at least one type of combo box, radio button, check box, spin, slider, edit box, static text, button and IP address.

10. The image forming apparatus of claim 7, wherein the interface unit transmits an executing result of the control setting to the image forming apparatus.

* * * * *